3,068,143
HALOALKYL PROPIOLATES AND BIOLOGICAL TOXICANTS COMPRISING SAME
Lee A. Miller, Dayton, Ohio, assignor to Monsanto Chemical Company, St. Louis, Mo., a corporation of Delaware
No Drawing. Filed Jan. 3, 1961, Ser. No. 80,026
15 Claims. (Cl. 167—22)

The present invention relates to halogenated, unsaturated esters and more particularly provides new and valuable esters of propiolic acid, the method of preparing the same, biological toxicant compositions comprising the new propiolates, and methods of inhibiting the growth of microorganisms in which said compositions are used.

According to the invention, haloalkyl propiolates are prepared by the reaction of a haloalkanol with propiolic acid or an acyl halide or an anhydride thereof, the reaction with, e.g., propiolyl chloride proceeding as follows:

wherein X is halogen, $n$ is a number of from 1 to 4, and R is a saturated, aliphatic hydrocarbon radical of from 2 to 6 carbon atoms.

Examples of haloalkyl propiolates provided by the invention and the haloalkanols from which they are prepared are:

2-chloroethyl propiolate from ethylene chlorohydrin;
2-bromoethyl propiolate from ethylene bromohydrin;
2-fluoroethyl propiolate from ethylene fluorohydrin;
2-iodoethylpropiolate from ethylene iodohydrin;
3-bromopropyl propiolate from 3-bromopropanol;
3-chloropropyl propiolate from 3-chloropropanol;
3-fluoropropyl propiolate from 3-fluoropropanol;
2,2-dichloroethyl propiolate from 2,2-dichloroethanol;
2,2-difluoroethyl propiolate from 2,2-difluoroethanol;
1,2-diiodoethyl propiolate from 1,2-diiodoethanol;
2,2,2-trichloroethyl propiolate from 2,2,2-trichloroethanol;
1,2,2-trichloroethyl propiolate from 1,2,2-trichloroethanol;
1,2,2,2-tetrabromoethyl propiolate from 1,2,2,2-tetrabromoethanol;
β-Fluoroisopropyl propiolate from 1-fluoro-2-propanol;
β,β'-Dichloroisopropyl propiolate from 1,3-dichloro-2-propanol;
β,β,β',β'-Tetrabromoisopropyl propiolate from 1,1,3,3-tetrabromo-2-propanol;
4-chloro-, 4-bromo-, 4-fluoro- or 4-iodobutyl propiolate from 4-chloro-, 4-bromo-, 4-fluoro- or 4-iodobutanol;
3,4-dichlorobutyl propiolate from 3,4-dichlorobutanol;
3-chloro-2,3,4-tribromobutyl propiolate from 3-chloro-2,3,4-tribromobutanol;
2,2,3-trichlorobutyl propiolate from 2,2,3-trichlorobutanol;
2,2,3,3-tetrachloro-1,1-dimethylpropyl propiolate from 3,3,4,4-tetrachloro-2-methyl-2-butanol;
5-chloro-, 5-bromo-, 5-fluoro- or 5-iodopentyl propiolate from 5-chloro-, 5-bromo-, 5-fluoro- or 5-iodopentanol;
2,3-dibromo-1-methylbutyl propiolate from 3,4-dibromo-2-pentanol;
5,5,5-trichloropentyl propiolate from 5,5,5-trichloropentanol;
4,5,5,5-tetrachloropentyl propiolate from 4,5,5,5-tetrachloropentanol;
6-chloro-, 6-bromo-, 6-iodo- or 6-fluorohexyl propiolate from 6-chloro-, 6-bromo-, 6-iodo- or 6-fluorohexanol;
1-(1,2-dibromoethyl)-3,4-dibromobutyl propiolate from 1,2,5,6-tetrabromo-3-hexanol;
2-bromo-1-trifluoromethylbutyl propiolate from 3-bromo-1,1,1-trifluoro-2-pentanol, etc.

Reaction of the haloalkanol with the propiolic acid or acyl halide or anhydride thereof takes place readily by simply contacting the acidic compound with the haloalkanol at ordinary or increased temperature and in the presence of an inert diluent or solvent. Advantageously, when propiolic acid is used, reaction is effected at a temperature of from, say, 50° C. to 120° C. and heating within this temperature range is conducted until the desired extent of esterification has occurred. Using the propiolyl halide, i.e., propiolyl chloride, bromide, iodide or fluoride, optimum conditions include operation at temperatures which may be as low as, say, −10° C., i.e., extraneous heating will be generally unnecessary; instead, cooling may be employed. Since formation of the ester occurs by reaction of one mole of the haloalkanol with one mole of the propiolic acid compound, the two reactants are advantageously employed in such stoichiometric proportion. However, an excess of the acidic compound may be employed, since any unreacted acid, anhydride or halide may be readily removed from the reaction product.

The presence of an inert diluent or solvent and operation at a temperature which is below 120° C. is advantageous in avoiding side-reactions, e.g., polymerization; operation in this manner apparently permits substantial limitation of the reaction to esterification, rather than to other reactions which could be expected to occur with the highly active, triple-bonded acidic compounds and the bi- or polyfunctional haloalkanes.

Inert liquid diluents which are useful for the present purpose are liquid hydrocarbons generally, halogenated hydrocarbons, ethers, or ketones, e.g., benzene, toluene, xylene, hexane, petroleum spirits, dichlorobenzene, ethylene dichloride, carbon tetrachloride, tetrachlorohexane, dioxane, isopropyl ether, acetone, butanone, etc. The solvent or diluent, of course, serves to facilitate uniform distribution of the reactants throughout the reaction medium. When reacting a propiolyl halide with the haloalkanol, it is preferred to employ a solvent or diluent which minimizes the tendency of the hydrogen halide by-product to react with the triple bond of the propiolic acid compound. In this connection the solvent or diluent is selected on the basis of being the least compatible or having the poorest solvency for hydrogen halide. The preferred solvents or diluents for this purpose may be the cycloalkanes, e.g., cyclohexane, cyclopentane or the alkyl substituted cycloalkanes, etc., and the halogenated hydrocarbons.

When using propiolic acid as the starting material in the esterification reaction, water is formed as a by-product material. Since the reaction is of the equilibrium type, it is preferred that the by-product water be removed continuously during the course of the reaction in order to have the equilibrium shift in the desired direction. The solvent or diluent employed in the reaction may be selected on the basis that it will form an azeotrope with water or that it boils above water, and thus the temperature of reaction can be maintained at a level which facilitates removal of the water without affecting the solvent or diluent. Considering the prerequisites of a solvent or diluent, generally any organic material which is non-reactive with either the reactants or the product materials may be employed. The quantity of solvent or diluent employed in the reaction varies considerably depending upon the result which is desired. In some instances it may be desirable to employ a relatively small quantity of diluent as compared to the amount of reactants which are being used, whereas in other cases it may be desirable to use a relatively large quantity of solvent or diluent to facilitate intermixing of the reactants.

We have also found that when effecting the reaction with the free acid or the acid anhydride as the acid component, it is advantageous to operate in the presence of an acidic material as catalyst. Acids which are useful for this purpose are, e.g., the mineral acids such as sulfuric, hydrochloric, nitric or phosphoric acid, or chlorosulfonic acid, acidic salts such as ferric chloride or magnesium bisulfate, organic sulfonic acids such as benzenesulfonic acid, 4-toluene sulfonic acid, etc.

The presently provided propiolates are stable, well-characterized compounds which are advantageously employed for a variety of industrial and agricultural purposes, e.g., as copolymerizing monomers with vinyl compounds in synthetic resin and plastics manufacture and as intermediates in the pharmaceutical industry for the preparation of hypnotics and soporifics, e.g., by reaction with alkali metal alcoholates to give alkoxyalkyl propiolates; and, as will be hereinafter shown, as toxicant compositions effective in preventing or inhibiting the growth of fungi and bacteria.

The invention is further illustrated by, but not limited to, the following examples:

*Example 1*

A mixture consisting of 80.5 g. (1 mole) of 2-chloroethanol, 77 g. (1.1 moles, 10% excess) of propiolic acid, 0.5 g. of 4-toluenesulfonic acid and 200 ml. of benzene was stirred at reflux under a Dean-Stark apparatus for 14 hours. During this time 22 ml. of water had collected. The reaction mixture was allowed to cool and then washed with 10% aqueous sodium bicarbonate and water. Benzene (100 ml.) was added and the whole was evaporated to give 90 g. of residue. This was distilled to give 82.8 g. (63% theory) of the substantially pure 2-chlorethyl propiolate, B.P. 74–77° C./30 mm. $n_D^{25}$ 1.4545 which analyzed 45.12% carbon and 4.01% hydrogen as against 45.30% and 3.80%, the calculated values. Infrared analysis showed the following structures:

≡CH at 3300 cm.$^{-1}$
$CH_2$ at 2975 cm.$^{-1}$
C≡CH at 2125 cm.$^{-1}$
C=O at 1725 cm.$^{-1}$
C—O-ester at 1212 cm.$^{-1}$

*Example 2*

A mixture consisting of 50.0 g. (0.4 mole) of 2-bromoethanol, 30.8 g. (0.44 mole, 10% excess) of propiolic acid, 150 ml. of benzene and 0.5 g. of p-toluenesulfonic acid was stirred at reflux for 12 hours. During this time 8.0 ml. of water collected in the Dean-Stark trap which formed a part of the reaction equipment. The resulting reaction was washed first with 10% aqueous sodium bicarbonate solution and then with water. Benzene was added to the washed product and the whole was evaporated to give 55 g. of yellow oil. This was vacuum distilled to give 48.2 g. (68% of theory) of the substantially pure 2-bromoethyl propiolate, B.P. 79–81° C./30 mm., which analyzed 34.14% carbon and 3.14% hydrogen, as against 33.92% and 2.85%, the respective calculated values. Infrared analysis showed the following structures:

≡CH at 3300 cm.$^{-1}$
CH, aliphatic at 2975 cm.$^{-1}$
C≡CH at 2125 cm.$^{-1}$
C=O at 1720 cm.$^{-1}$
C—O-ester at 1300–1220 cm.$^{-1}$

*Example 3*

A mixture consisting of 29.8 g. (0.2 mole) of 2,2,2-trichloroethanol, 15.4 g. (0.22 mole, 10% excess) of propiolic acid, 150 ml. of benzene and 0.5 g. of p-toluenesulfonic acid was stirred at reflux for 15 hours in a reaction vessel which was equipped with a Dean-Stark trap for removal of reaction water. Ether (100 ml.) was added to the reaction mixture and the whole was washed, first with three 100 ml. portions of 10% aqueous sodium bicarbonate and then with two 100 ml. portions of water. Benzene (100 ml.) was added to the washed product and the whole was evaporated to give 27.6 g. of an oil. This was distilled to give the substantially pure 2,2,2-trichloroethyl propiolate, B.P. 75–88° C./20 mm., $n_D^{25}$ 1.4760.

*Example 4*

This example shows testing of the 2-chloroethyl propiolate of Example 1 and of the 2-bromoethyl propiolate of Example 2 against the fungus *Aspergillus niger*. The following procedure was used:

An inoculum preparation of *Aspergillus niger* SN–111 was prepared by adding 10 ml. of sterile distilled water to a 7-day old, Sabouraud's dextrose agar slant culture thereof and dislodging the spores into the water with a transfer needle.

Culture media were prepared by respectively adding 18 ml. of Sabouraud's dextrose agar to 18 x 150 mm. straight side test tubes, capping with metal culture tube caps, and sterilizing in an autoclave for fifteen minutes at 121° C.

A stock solution of the test compound was prepared by dissolving 100 mg. of the compound in 10 ml. of acetone; a 1% acetone solution of the compound was thus obtained.

Using a sterile 5 ml. pipette, 2 ml. of said 1% solution were respectively transferred to a tube of melted, sterile culture media prepared as described above. Dilutions of 1 part of test compound per 1,000 parts of agar resulted. Dilution was thus repeated until a concentration of one part of test compound per 10,000 parts of agar was obtained. The thus-diluted agar was then poured into sterile Petri dishes and allowed to harden. Two dishes of agar containing the same concentration of acetone but none of the test compound were also prepared and allowed to harden; these were to be used for "controls."

The plates of agar were then respectively inoculated with one drop of the above-described inoculum preparation. Examination of the plates after a five-day incubation period showed no growth of the *Aspergillus niger* in those of the plates which contained the 1:10,000 concentration of either the 2-chloroethyl propiolate or of the 2-bromoethyl propiolate, whereas profuse growth of the *Aspergillus niger* was noted in both of the "control" plates.

*Example 5*

This example shows testing of the 2-chloroethyl propiolate of Example 1 and of the 2-bromoethyl propiolate of Example 2 against the bacteria *Staphylococcus aureus*. The following procedure was used:

A 1% acetone solution of the test compound was prepared and added to sterile, melted nutrient agar to give an 0.01% concentration of the test compound. The agar solution of the test compound was then poured into Petri dishes and allowed to harden. These plates as well as duplicate "controls" (plates of sterile nutrient agar containing the same concentration of acetone but none of the test compound) were respectively inoculated with the *Staphylococcus aureus* and incubated for two days at 37° C. At the end of that time, inspection of the plates showed no growth of the test bacteria on those of the plates which contained the 0.01% concentration of either the 2-chloroethyl propiolate or of the 2-bromoethyl propiolate, whereas profuse growth of the test organisms was noted on the "controls."

*Example 6*

The 2-bromoethyl propiolate of Example 2 was tested against the soil fungus *Rhizoctonia solani*. Testing was conducted by adding to soil which had been uniformly infected with the fungus a quantity of the propiolate which was 0.003% of the weight of the soil, thoroughly mixing the whole, incubating at 25° C. for 24 hours, seeding pots of the incubated soil with cotton and cucumber seeds, maintaining the seeded pots for 48 hours at 70° F. and at a high relative humidity (96–98%), removing the pots to the greenhouse, maintaining them there for 2 weeks, and inspecting them for number of seedlings emerged and the condition of the shoots and roots thereof. A similar testing procedure was conducted with "controls," i.e., similarly inoculated soil which had not been chemically treated. A very poor percent emergence and a stunted diseased condition of those of the plants which had emerged was noted in the controls, whereas excellent germination and plant growth was observed in the pots of inoculated soil which contained the 0.003% concentration of 2-bromoethyl propiolate.

Similar testing of the 2-chloroethyl propiolate of Example 1 and of the 2-bromoethyl propiolate of Example 2 against the soil fungus Pythium ultimum showed these propiolates to inhibit completely the growth of the Pythium at the 0.003% concentration.

The present haloalkyl propiolates are characterized by a high degree of efficacy in that they possess biological toxicant efficacy at very low concentrations. Fungistat or bacteriostat compositions containing the present compounds are advantageously formulated by first preparing a solution thereof in an organic solvent and then adding the resulting solution to water containing an emulsifying agent to form an oil-in-water emulsion. Emulsifying agents which may be employed are those customarily used in the art for the preparation of oil-in-water emulsions, e.g., the higher alkylbenzenesulfonates, the long chained polyalkylene glycols, the long chained alkylsulfosuccinates, etc.

While the present compounds are most advantageously employed as biological toxicants by incorporating them into an emulsion as herein described, they may also be incorporated into solid carriers such as clay, talc, pumice or bentonite to give compositions which may be applied either to infested areas or to locale which may be subjected to infestation. They may also be dissolved in liquefied gases such as the fluorochloroethanes or methyl chloride and applied from aerosol bombs containing the solution.

What I claim is:

1. 2,2,2-trichloroethyl propiolate.
2. The method of inhibiting the growth of microorganisms selected from the class consisting of fungi and bacteria which comprises exposing the microorganisms to a growth-inhibiting quantity of a propiolate of the formula

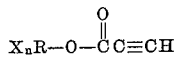

in which X is halogen, $n$ is a number of 1 to 4 and R is a saturated, aliphatic hydrocarbon radical of 2 to 6 carbon atoms.

3. The method of inhibiting the growth of fungi which comprises exposing the fungi to a growth-inhibiting quantity of a propiolate of the formula

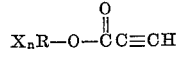

in which X is halogen, $n$ is a number of 1 to 4 and R is a saturated, aliphatic hydrocarbon radical of 2 to 6 carbon atoms.

4. The method of inhibiting the growth of fungi which comprises exposing the fungi to a growth-inhibiting quantity of 2-chloroethyl propiolate.

5. The method of inhibiting the growth of fungi which comprises exposing the fungi to a growth-inhibiting quantity of 2-bromoethyl propiolate.

6. A composition effective against a microorganism selected from the class consisting of fungi and bacteria which comprises an oil-in-water emulsion of a propiolate of the formula

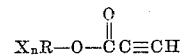

in which X is halogen, $n$ is a number of 1 to 4 and R is a saturated, aliphatic hydrocarbon radical of 2 to 6 carbon atoms, said propiolate being present in a quantity which inhibits the growth of the microorganism.

7. A composition effective against fungi which comprises an oil-in-water emulsion of a fungistatic quantity of a propiolate of the formula

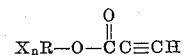

in which X is halogen, $n$ is a number of 1 to 4 and R is a saturated, aliphatic hydrocarbon radical of 2 to 6 carbon atoms.

8. A composition effective against bacteria which comprises an oil-in-water emulsion of a bacteriostatic quantity of a propiolate of the formula

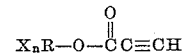

in which X is halogen, $n$ is a number of 1 to 4 and R is a saturated, aliphatic hydrocarbon radical of 2 to 6 carbon atoms.

9. A composition effective against bacteria which comprises an oil-in-water emulsion of a bacteriostatic quantity of 2-chloroethyl propiolate.

10. A composition effective against bacteria which comprises an oil-in-water emulsion of a bacteriostatic quantity of 2-bromoethyl propiolate.

11. A composition effective against fungi which comprises an oil-in-water emulsion of a fungistatic quantity of 2-chloroethyl propiolate.

12. A composition effective against fungi which comprises an oil-in-water emulsion of a fungistatic quantity of 2-bromoethyl propiolate.

13. The method of inhibiting the growth of bacteria which comprises exposing the bacteria to a bacteriostatic quantity of a propiolate of the formula

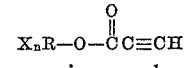

in which X is halogen, $n$ is a number of 1 to 4 and R is a saturated, aliphatic hydrocarbon radical of 2 to 6 carbon atoms.

14. The method of inhibiting the growth of bacteria which comprises exposing the bacteria to a bacteriostatic quantity of 2-chloroethyl propiolate.

15. The method of inhibiting the growth of bacteria which comprises exposing the bacteria to a bacteriostatic quantity of 2-bromoethyl propiolate.

References Cited in the file of this patent

Heaton et al.: J.A.C.S., vol. 71, pp. 2948–2949 (1949).